United States Patent [19]

Vriesema

[11] Patent Number: 4,988,776
[45] Date of Patent: Jan. 29, 1991

[54] POLYMER COMPOSITION ON THE BASIS OF POLYMER AND A POLYESTER AMIDE

[75] Inventor: Bindert K. Vriesema, Sittard, Netherlands

[73] Assignee: Stamicarbon B. V., Geleen, Netherlands

[21] Appl. No.: 457,560

[22] Filed: Dec. 27, 1989

[30] Foreign Application Priority Data

Dec. 28, 1988 [NL] Netherlands ............. 8803181

[51] Int. Cl.$^5$ ............. C08F 283/04; C08G 69/48; C08L 67/00
[52] U.S. Cl. ............. 525/425
[58] Field of Search ............. 525/425

[56] References Cited

U.S. PATENT DOCUMENTS

| | | | |
|---|---|---|---|
| 3,816,417 | 6/1974 | Economy et al. | 528/495 |
| 4,097,445 | 6/1978 | Martins et al. | 525/425 |
| 4,145,372 | 3/1979 | Murray et al. | 525/425 |
| 4,206,100 | 6/1980 | Kyo et al. | 525/425 |
| 4,217,435 | 8/1980 | McConnell et al. | 525/425 |
| 4,254,242 | 3/1981 | Kyo et al. | 525/425 |
| 4,410,683 | 10/1983 | Gale | 528/299 |
| 4,567,227 | 1/1986 | Kiss | 525/425 |
| 4,812,534 | 3/1989 | Blakely | 525/425 |

FOREIGN PATENT DOCUMENTS 2326472 12/1974 Fed. Rep. of Germany ...... 525/435

*Primary Examiner*—Kriellion Morgan
*Attorney, Agent, or Firm*—Cushman, Darby & Cushman

[57] ABSTRACT

The invention relates to a melt-processible aromatic (co)polymer composition containing:
1-99 wt. % of a liquid crystalline polymer, and
99-1 wt. % of a polymer derived from units, capable of forming a liquid crystalline polymer, and from one or more triazine units according to the formula (I)

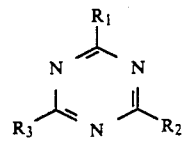

where $R_1$ is an amino group, $R_2$ and $R_3$ is an (alkyl)carboxyl-, an (alkyl)hydroxy- and/or an amino group.

Besides excellent mechanical properties, the (co)polymer composition according to the invention possesses an improved thermal shock resistance. The (co)polymer composition is eminently suited for use in objects for the electrical industry and the aircraft industry.

12 Claims, No Drawings

POLYMER COMPOSITION ON THE BASIS OF POLYMER AND A POLYESTER AMIDE

The invention relates to an aromatic melt-processable (co)polymer composition, comprising a liquid crystalline polymer and polyesteramide.

Aromatic melt-processible polymers are widely applied in the production of, inter alia, fibres and objects possessing good mechanical properties and a high thermal stability.

In the processing of such polymers, in particular polymers displaying so-called liquid crystalline behaviour, shear forces cause anisotropy, as a result of which the strength perpendicular to the direction of processing or orientation is much lower than that in the direction of processing or/and orientation.

EP-B-0083426 discloses that incorporation of a compound containing trifunctional groups can yield melt-processable (co)polymers with liquid crystalline properties in which the strength perpendicular to the direction of processing or orientation is improved. The functional groups of the compound to be incorporated contain either only hydroxyl or only carboxyl functions. In addition, the polymer units are to satisfy several requirements.

According to the comparative examples of EP-B-0083426 the transverse strength of the fibres, expressed in the knot strength, can be improved by about 25% without further treatment. An improvement by a factor 2 is possible only after prolonged heat treatment of the spun fibre. However, this last operation has a negative effect on the mechanical properties in the longitudinal direction of the fibre. The initial modulus, for instance, decreases by some 30%.

EP-A-0183433 describes a blend of a liquid crystalline polymer and a polyesteramide. The polyesteramide is derived from divalent aromatic amide-units. The disadvantages of the blends, as described in EP-A-0183433, are the bad mechanical properties perpendicular to the direction of orientation of the polymers. The described blends are therefore not suitable for forming objects with a three-dimensional shape.

The object of the invention now is to modify the polyester so as to obtain a considerable improvement of the mechanical properties perpendicular to the direction of orientation without having to aftertreat the moulded object obtained from the melt, while the properties in the direction of orientation remain at least at the same level.

The (co)polymer composition according to the invention is characterized in that it contains 1-99 wt. % of one or more polyesteramides, derived from units, capable of forming a liquid crystalline polymer, and from one or more triazine units according to formula (I):

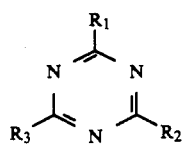

where $R_1$ is an amino group, $R_2$ and $R_3$ is an (alkyl)carboxyl group, an (alkyl)hydroxy group and/or an amino group.

The melt-processible aromatic (co)polymer composition according to the invention is characterized particularly in that the (co)polymer composition contains a polyester amide derived from melamine.

It is to be noted that DE-A-2157696 describes polyesters derived from triazine-units and monomers which are capable of forming a liquid crystalline polymer. However the monomers linked to the triazine units are linked by a C—O bond. There is no mentioning of an amide-bond for obtaining a polyesteramide.

Triazine units such as melamine and derivatives thereof are discussed exhaustively in The Chemistry of heterocyclic compounds, s-triazine and derivatives, by Edwin M. Smolin and Lorence Rapoport, 1959, Interscience Publishers, New York, included as reference.

Surprisingly, it has been found not only that by the use of minor amounts of a polyester amide derived from melamine the mechanical properties in the direction perpendicular to the direction of orientation can be improved substantially without an extra treatment or heat treatment of the product obtained being necessary, but also that the modulus of elasticity parallel to the direction of orientation has been improved substantially.

The (co)polymer composition according to the invention contains 1–99 wt. % of the polyester amide derived from melamine, preferably 2–50 wt. %. Besides the polyester amide, the (co)polymer composition according to the invention preferably contains at least one melt-processable aromatic polymer.

In principle, polymers in the (co)polymer composition according to the invention can be any melt-processable polymer. However, the effect of the invention is greatest when the aromatic polymers exhibit liquid crystalline properties. Such polymers with liquid crystalline properties and their preparation are described at length in, inter alia: NL-A-7505551; DE-C-2834536; DE-C-2834537; JP-A-43223; U.S. Pat. Nos. 3,991,013; 3,884,876; 3,974,250; 3,991,014; 4,057,597; 4,066,620; 4,067,852; 4,075,262; 4,083,829; 4,093,595; 4,118,372; 4,130,545; 4,130,702; 4,146,702; 4,153,779; 4,156,070; 5,159,365; 4,161,470; 4,169,933; 4,181,792; 4,183,895; 4,184,996; 4,188,476; 4,201,856; 4,219,461; 4,224,433; 4,230,817; 4,232,143; 4,232,144; 4,238,598; 4,238,599; 4,238,600; 4,242,496; 4,245,082; 4,245,084; 4,247,514; 4,256,624; 4,265,802; 4,207,304; 4,269,965; 4,272,625; 4,279,803; 8,284,757; 4,285,852; 4,287,332; 4,294,955; 4,299,756; 4,311,824; 4,314,073; 4,318,841; 4,318,842; 4,330,457; 4,332,759; 4,337,190; 4,337,191; 4,339,375; 4,341,688; 4,346,208; 4,347,349; 4,351,917; 4,351,918; 4,355,132; 4,355,133; 4,355,134; 4,359,569; 4,360,658; 4,362,777; 4,370,466; 4,371,660; 4,375,530; 4,381,389; 4,348,016; 4,393,191; 4,394,498; GB-A-1,568,541; EP-A-24,499 and 45,499.

In general, liquid crystalline polymers are composed of rigid aromatic units. These are understood to be monomers in which at least an aromatic ring (Ar) is present, for instance:

 (a)

 (b)

 (c)

Depending on the application of the moulding compound prepared from (co)polymer composition according to the invention, such a polymer may also contain amide, sulpho, anhydride, thioester, urethane and/or carbonate groups.

Preferably the polyester amide, apart from the triazine unit, and the polymer in the composition are composed of the same polymer-forming units. More in particular the polymer-forming units are derived from parahydroxybenzoic acid, biphenol and isophthalic and/or terephthalic acid.

The melamine content of the polyester amide may vary between wide limits and is determined to a substantial degree by the length of the polymer chains of the melamine skeleton and the resulting viscosity of the polymer composition, which affects the processibility. In general a melamine content below 0.01 mole %, calculated on the total weight of polymer-forming units in the polyester amide, will not have any appreciable effect, while a content in excess of 10 mole % will lead, also in low-molecular polymers, to an unacceptable increase in the melt viscosity, rendering it impossible to process the composition by the usual techniques. Preferably the content is chosen between 0.01 and 2 mole %, even more preferably between 0.01 and 1 mole %.

The polyester amide derived from melamine can be obtained in different ways by a condensation reaction of the amine groups from the melamine with units containing carboxyl or ester end groups. For a rapid reaction in general an elevated temperature, for instance higher than 200° C., preferably higher than 250° C., and/or the presence of a catalyst are required, preferably the known polycondensation catalysts, for instance magnesium and/or zinc acetates. Melamine can be mixed simultaneously with other polymer-forming units, but it is also possible to add melamine to the polymer-forming units when the desired degree of polymerization has almost been reached. In the latter method the melamine incorporation preferably amounts to between 0.01 and 0.5 mole %. The effect of melamine incorporation can be monitored immediately on the basis of the change in the melt viscosity. Melamine may be added in dissolved form, for instance in a high-boiling inert solvent, or as a solid in powder form. Preference is to be given to addition as a solid in finely dispersed form.

In the melt a previously prepared thermotropic polymer is added to the reaction product formed. After cooling of the reactor contents the polymer composition according to the invention is obtained in solid form.

It also is possible to mix the polyester amide thus formed with a thermotropic polymer in the customary mixing devices. Particularly suitable as mixing device is a single and/or double-screw extruder.

If desired the polymer composition according to the invention can be after-condensed in the solid phase at elevated temperature.

Because of the high mechanical properties, in particular the high modulus of elasticity, and the good thermal impact resistance, the (co)polymer composition according to the invention is particularly suitable for use as fibre or film, particularly in the textile and packaging industries.

Objects made wholly or partly from the (co)polymer composition according to the invention possess excellent properties with respect to tensile strength, chemical resistance and heat resistance. This makes the polymer according to the invention eminently suited for use in electrical engineering and in the aircraft industry.

The customary additives may be added to the polymer composition according to the invention, for instance glass, stabilizers, lubricants and organic and inorganic fillers and reinforcing agents.

The invention will be elucidated on the basis of the following examples, without being restricted thereto.

EXAMPLES

Preparation of thermotropic polymer A

In a reaction vessel equipped with stirrer, nitrogen inlet tube and reflux cooler 850 g acetic anhydride was introduced. The following was added:
 3.2 moles p-hydroxybenzoic acid
 1.6 moles terephthalic acid
 1.6 moles p,p'-biphenol
 1 g zinc acetate The suspension was heated to 155° C. and kept at this temperature for 1–3 hours (refluxing). Subsequently the reflux cooler was converted into a distillation cooler. The temperature was raised by 46° C./hour to 315° C. and then kept constant until the desired conversion had been achieved (92%).

After cooling to room temperature the polymer obtained was ground, after-condensed (12 hours, 365° C.) and characterized by means of Differential Scanning Calorimetry (DSC). Melting point (Tm)=401° C.

Preparation of thermotropic polyester amide B

In a reactor vessel equipped with stirrer, nitrogen inlet tube and reflux cooler 850 g acetic anhydride was introduced. The following was added:
 3.2 moles p-hydroxybenzoic acid
 1.6 moles terephthalic acid
 1.6 moles p,p'-biphenol
 1 g zinc acetate.

At the end of the prepolymerization (after 92% conversion) 0.01 mole melamine (0.16 mole %) was added and polymerization was continued for three minutes.

After cooling to room temperature the resulting polymer was ground, after-condensed (12 hours, 365° C.) and characterized by means of Differential Scanning Calorimetry (DSC). Melting point (Tm)=415° C.

EXAMPLES 1 THROUGH 4 AND COMPARATIVE EXAMPLE A

Polymer A and polyester amide B were mixed in the amounts shown in Table 1 in a ZSK extruder at 420° C.

Of the polymer composition obtained injection moulding specimens of 1.6 mm thick were made. These specimens were characterized for their modulus of elasticity according to ASTM D-790, 23° C.

TABLE 1

| Example | Polymer A wt. % | Polyester amide B wt. % | E-modulus N/mm² ∥ | ⊥ |
|---|---|---|---|---|
| 1 | 50 | 50 | 19,000 | 3,900 |
| 2 | 75 | 25 | 18,200 | 3,400 |
| 3 | 90 | 10 | 17,500 | 3,350 |
| A | 100 | — | 17,000 | 3,000 |

EXAMPLE 4

75 wt. % of prepolymer A, as described (92% conversion), was mixed in the melt with prepolyester amide B (25 wt. %).

After cooling to room temperature the resulting polymer composition was ground, after-condensed (12 hours, 365° C.) and characterized by means of DSC. Melting temperature Tm=405° C.

E-modulus:

$\| = 18,700$ N/mm$^2$ $\perp = 3,500$ N/mm$^2$

I claim:

1. Melt-processable aromatic (co)polymer composition, comprises a blend of a liquid crystalline polymer and a polyesteramide, characterized in that the composition contains 1–99 wt. % of one or more polyesteramides, derived from units, capable of forming a liquid crystalline polymer, and from one or more triazine units according to formula (I):

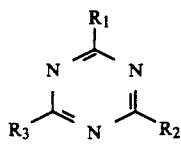

where $R_1$ is an amino-group, $R_2$ and $R_3$ is an (alkyl)carboxyl group, an (alkyl)hydroxy group and/or an amino group.

2. Polymer composition according to claim 1, characterized in that the polyesteramide derived from a triazine unit is a polyester amide derived from melamine.

3. Polymer composition according to claim 2, characterized in that the polymer composition contains 2–50 wt. % of the polyester amide.

4. Polymer composition according to claim 1, characterized in that the polymers from the composition possess liquid crystalline properties.

5. Polymer composition according to claim 1, characterized in that the polyester amide, apart from the triazine unit, and the other polymer of the composition are composed of the same polymer-forming compounds.

6. Polymer composition according to claim 4, characterized in that the polymer-forming units are derived from para-hydroxybenzoic acid, biphenol and terephthalic and/or isophthalic acid.

7. Polymer composition according to claim 2, characterized in that the melamine content of the composition, expressed in the percentage by weight of melamine relative to the total weight of the polyester amide, is 0.01 to 10 mole %.

8. Polymer composition according to claim 7, characterized in that the melamine content of the polyester amide is 0.01 to 2 mole %.

9. Polymer composition according to claim 8, characterized in that the melamine content of the polyester amide is 0.01 to 1 mole %.

10. Process for the preparation of the polymer composition according to claim 1 by reaction of the polymer-forming units and melamine in the melt, characterized in that the melamine is added at the moment that the polymer has virtually reached the desired degree of polymerization, based on a degree of conversion of at most 96%, after which the reaction is continued for a short time and the reaction product is mixed in the melt with a polymer, the polymer composition obtained after cooling in the solid phase at elevated temperature being after-condensed.

11. Moulding compound obtained from polymer composition according to claim 1.

12. Fibre obtained from the polymer composition according to claim 1.

* * * * *